United States Patent [19]

Tanoshima

[11] Patent Number: 5,759,225
[45] Date of Patent: Jun. 2, 1998

[54] CULTURE SOIL, PROCESS FOR PRODUCING THE SAME, AND SEEDLING-GROWING PEAT BOARD

[75] Inventor: Tetsuya Tanoshima, 2-24, Katase 3, Fujisawa-shi, Kanagawa-ken, Japan

[73] Assignees: Tetsuya Tanoshima, Kanagawa-ken; Kawasho Corporation, Osaka-fu, both of Japan

[21] Appl. No.: 677,867

[22] Filed: Jul. 10, 1996

[30] Foreign Application Priority Data

Jul. 10, 1995 [JP] Japan .................... 7-195707

[51] Int. Cl.$^6$ ................ C05F 11/02; A01G 9/10
[52] U.S. Cl. .................... 71/24; 44/490; 47/66; 47/74; 47/77; 427/212; 427/397.7; 427/397.8; 427/439; 428/375; 428/376; 428/378; 428/396; 428/404; 435/240.54
[58] Field of Search .................... 44/490; 71/24; 427/212, 397.7, 397.8, 439; 428/375, 376, 378, 396, 404; 435/240.54; 47/77, 66, 74

[56] References Cited

U.S. PATENT DOCUMENTS

| 3,573,892 | 4/1971 | Atkins et al. | 71/24 |
| 3,656,930 | 4/1972 | Martin | 71/24 |
| 3,990,180 | 11/1976 | Bunting | 47/74 |
| 4,404,013 | 9/1983 | Rainbow | 71/24 |

*Primary Examiner*—Rabon Sergent
*Attorney, Agent, or Firm*—Wenderoth, Lind & Ponack

[57] ABSTRACT

Peat moss having water repellency when it is dry is used as culture soil by subjecting it to a water repellency preventing treatment. In addition, a seedling-growing peat board with few germs and impurities, being lightweight and easy to handle, and particularly suitable for use as bed soil of a seed bed, is provided. The culture soil contains peat moss which is water repellent when dry, and a water-absorbing clay adhered to the surface of the peat moss. This is accomplished by treating water to render it absorbable by peat moss, suspending a water-absorbing clay in the treated water, contacting the peat moss with the suspension to absorb the suspension onto the surface of the peat moss, and drying the peat moss.

10 Claims, 2 Drawing Sheets

CULTURE SOIL, PROCESS FOR PRODUCING THE SAME, AND SEEDLING-GROWING PEAT BOARD

BACKGROUND OF THE INVENTION

1. Field of the Invention

The present invention relates to culture soil having water absorption properties for growing plants, and a process for producing the same, and particularly relates to a seedling-growing peat board to be used as bed soil on a seedling-growing seed bed in rice-production.

2. Description of the Prior Art

Recently, it has become difficult from year to year to obtain culture soil for growing plants in Japan, due to environmental disruption and soil pollution. Accordingly, the utilization of peat moss as culture soil has increased rapidly, peat moss being a natural material, produced in Canada, North Europe, U.S.S.R., and New Zealand, and said to be inexhaustible.

It is now possible to form peat moss, supplied in amounts of 3.8 CF (cubic feet) (108 liters), 4 CF (113 liters) and 6 CF (170 liters), into a block in a very dry condition thereof with a water content of from 5 to 15%. Peat moss formed into a block, such as a tablet and a board, has been known widely; such blocks employ peat moss with no water repellency or they are treated with chemical substances (water-absorbing polymers, surface active agents, etc.).

A seed bed with bed soil spread all over a seedling-growing box has been used in order to grow seedlings in rice-production. Bed soil is prepared by adding leaf mold and fertilizers to base soil, and piling and aging them, or mixing them. As base soil there are used a rice paddy, field soil and red soil with few germs. Seedlings grown in a seed bed become mat-like according to a seed bed unit, in which roots of seedlings are entwined (called a seed mat). The seed mat is taken off the seed bed in its mat-like form and transferred into a rice planting machine. The rice planting machine picks up several seedlings from the seed mat and transplants them on a regular rice paddy.

Peat moss is divided into sphagnum-based peat moss and hypnum-based peat moss; sphagnum-based peat moss with bog moss as a main component generally becomes water-repellent when the water content thereof is below 30%, and becomes very difficult to absorb water. Particularly, most Canadian peat moss becomes water-repellent, though it is of good quality with few germs and impurities. Since peat moss is strongly acidic, the pH thereof needs to be adjusted, and in addition, even if the pH is adjusted, it becomes water-repellent again once it is dried, and it also becomes dust-like in the wind and scatters; thus it is difficult to handle.

Because of the above reasons, dry peat moss can not be used as culture soil as it is, and is not suitable as seedling-growing bed soil in rice-production, mainly due to its water repellency.

In addition, a conventional seed bed is heavy; for example, a seed bed with culture soil (burnt soil) as main material weighs from 7 to 8 kg per box, which has made the work of arranging seed beds and transferring seed mats into a rice planting machine difficult. A seed mat of rock wool, which is deemed lightweight, has a disadvantage that since the bond of rock wool fibers is too strong, the number of seedlings per stump taken off a seed mat with a planting nail of a rice planting machine can not be fixed, and there is also a problem that it remains as a mineral frame in a rice paddy.

SUMMARY OF THE INVENTION

Hence, it is an object of the present invention to provide culture soil with few germs and impurities, having water retention from 3 to 4 times the weight of the culture soil, being lightweight and easy to handle, and being suitable particularly for use as bed soil of a seed bed.

Another object of the invention is to provide a process for producing the culture soil by subjecting peat moss having water repellency when it is dry to a water repellency preventing treatment while adjusting the pH thereof with a view to utilizing it as culture soil.

It is still another object of the present invention to provide a seedling-growing peat board having the advantages that the number of seedlings per stump taken off a seed mat with a planting nail of a rice planting machine is almost constant, and that it is lightweight.

With a view to solving the above problems, and achieving these objects, the present invention provides a culture soil having water absorption properties, comprising peat moss which is water repellent when dry, and a water-absorbing clay adhered to the surface of the peat moss. This culture soil can be formed into a peat board for growing seedlings.

Furthermore, the present invention provides a process for producing a culture soil having water absorption properties, comprising the following steps:

(a) treating water to render the water absorbable by peat moss;

(b) suspending a water-absorbing clay in the treated water of step (a);

(c) contacting peat moss which is water repellent when dry with the suspension of step (b) to absorb the suspension onto the surface of the peat moss; and (d) drying the peat moss of step (c), for example to a water content of less than 30%, such as 5 to less than 30%, to produce peat moss having the clay adhered to the surface of the peat moss.

DETAILED DESCRIPTION OF THE INVENTION

Figure 1:
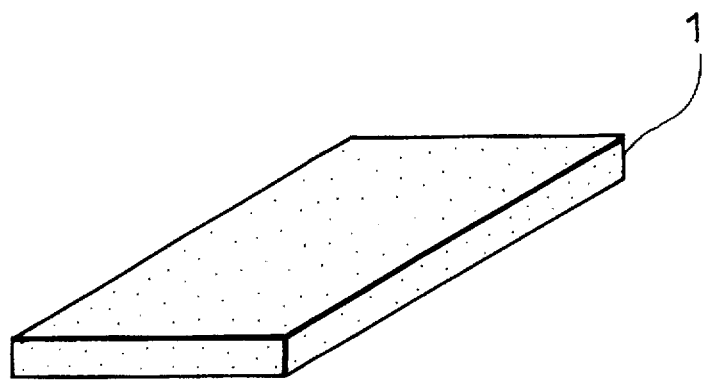
FIG. 1 is a perspective view showing a seedling-growing peat board obtained by molding culture soil according to the present invention into a board-like form.

The culture soil of the present invention comprises peat moss having water repellency when it is dry, and a film obtained by suspending a water-absorbing clay material into water which has been subjected to a surface activation treatment (to activate the surface of the peat moss to render it capable of absorbing water), and allowing the peat moss to come into contact therewith, thereby allowing the water-absorbing clay material to be adhered onto the circumference, i.e. surface of the peat moss.

In a preferred embodiment of the present invention, the clay material comprises bentonite.

In another preferred embodiment of the present invention, water subjected to the surface activation treatment is obtained by allowing water to come into contact with a tourmaline mineral.

The seedling-growing peat board of the present invention is produced by molding the above-described culture soil into a square thin board, e.g. having a thickness of 0.5 to 6 cm.

Peat moss has a cell-like (tube-like) form with concave and convex areas on its trunk (stem), and the cell (tube) has a structure of absorbing water and keeping a large amount of water therein. Once it is dried, however, air enters the cell (tube) and causes internal pressure to prevent the penetration of water.

By allowing peat moss to come into contact with water containing water-absorbing clay suspended therein, a film of the water-absorbing clay material, for example having a thickness of 10 to 250 microns, is adhered onto the circumference of the peat moss preferably to substantially the entire surface of the peat moss. When dried peat moss with a film adhered thereon is allowed to contain water, water penetrates into the film and the cell (tube) of the peat moss due to the water-absorbing effect of the film.

In addition, the above clay material has an effect of adjusting the pH of peat moss when selected properly.

Hereunder, culture soil, a process for producing the same and a seedling-growing peat board according to the present invention will be described according to the preferred embodiments shown in the drawings.

FIG. 1 shows a seedling-growing peat board obtained by molding culture soil according to the present invention into a board-like form.

The seedling-growing peat board 1 is obtained by subjecting Canadian peat moss having water repellency when it is dried to a coating treatment with bentonite (a kind of clay produced according to the modification of a volcanic rock or tuff rock, with montmorillonite as a main component and having a large swelling power; used for the prevention of water leakage in a paddy field) and molding it into a board-like form after drying it. When in use, the seedling-growing peat board 1 of the present embodiment contains water and therefore becomes swelled, but it is very light and compact in a dry condition, weighing from 400 to 500 g. Accordingly, it increases the efficiency of the work of transportation and does not need much space for storage.

Next, an embodiment of a process for producing culture soil according to the present invention will be described. The present embodiment comprises the following steps.

(a) First step: ordinary water (tap water) is filtered with electric stone (tourmaline) and kept in a water tank. Or electric stone may be put into ordinary water kept in a water tank.

(b) Second step: bentonite is suspended in the water in the water tank after the first step to prepare an aqueous suspension with a bentonite concentration of from 5 to 30%.

(c) Third step: the aqueous suspension of the second step and peat moss are mixed for about 5 minutes; thereby the circumference of the peat moss fibers are subjected to a coating treatment. The peat moss is a Canadian peat moss with a water content of from about 45 to 50% immediately after the opening of an original bag thereof. When dry peat moss with a water content below 30% is used, it is preferable to lengthen the mixing time by 30 to 40%.

(d) Fourth step: the material produced by the third step is dried and put into a mold and subjected to compression processing (pressure: 35 kg/cm$^2$ or more, e.g. 35-75 kg/cm$^2$). It can be molded into any form such as a board-like form and a tablet-like form according to the form of the mold. In addition, roll molding can be performed.

In the above mixing and drying processes, it is possible according to a combination of a simple mixer and a drier (exhaust heat from an air compressor was utilized in this embodiment) to treat from 50 to 60 liters or more per hour, and hence if utilization of exhaust heat is performed more efficiently, the amount of a treatment can be more profitably improved.

If the above coating processing is performed according to a moistening method, a film can be formed by utilizing moisture retained by peat moss. In this case, moisture retained by peat moss is preferably from 45 to 60% so as not to impair peat moss fibers.

Even if retained moisture exceeds 60%, coating processing can be performed, but the following processes are needed in such a case.

Bentonite to be used as a pH adjustor is mixed with peat moss and stirred for a given time to form a bentonite thin film on the outer skin of the peat moss; then, in order to strengthen the adhesion of bentonite, pressure is exerted on the peat moss with the bentonite adhered thereon to squeeze retained moisture out of the peat moss. The moisture is allowed to be absorbed by the bentonite with excellent moisture absorption properties, and then it is dried.

Pressure to be applied needs to be more than 200 kg/cm$^2$ in the case that the water content of the peat moss is less than 40%, but it may be less than 50 kg/cm$^2$ in the case that the water content is near 60%.

The advantage of this method is that the drying process is comparatively easy due to the utilization of moisture retained by the peat moss.

Next, a water repellency-preventing treatment of peat moss having water repellency when it is dry, and the action and effects thereof, will be described according to a test example.

Water repellency is caused by the nature of bog moss of sphagnum-based peat moss (produced in Canada and the like). It is revealed according to magnification with a microscope (20–200× magnification) that this peat moss has a cell-like (tube-like) form with concave and convex areas on its trunk (stem). It is also understood that the peat moss has a structure of absorbing water in its cell-like (tube-like) portion and retaining a large amount of water (from 6 to 8 times the specific gravity of peat moss) therein.

According to the above, when peat moss is in a dry condition, air in the cell (tube) creates internal pressure in the cell and prevents the inflow of water. Since this retains a large amount of gas, like air, when the peat moss is dry, similarly, as the peat moss absorbs a large amount of water, the internal pressure becomes large. As a result, even if dry peat moss is introduced into water, it floats on the surface of water without absorbing water at all for a long period of time.

Water can be absorbed from this condition by performing the work of manual rubbing, thereby driving out air in the cells and destroying the balance of internal pressure. However, this requires a long time and hence can not be put into practical use.

There can be observed with a microscope a lot of silvering portions on the trunk (stem) of dried peat moss. Though an attempt of adhering drops of water put on the tip of a needle onto these portions was conducted, there was found a phenomenon of water repellency, rejecting the water.

It has been revealed according to the above that peat moss having water repellency when it is dry is characterized by the two elements of internal pressure in its cell (tube), and water repellency on the surface of the cell (tube).

In the present invention, an attempt of preventing water repellency was conducted by forming thin films on the trunk (stem) and the cross section of peat moss artificially (coating treatment) with a view of learning how to prevent this water repellency.

As film materials, those satisfying the following criteria were selected, taking only a treatment with natural substances into consideration and excluding chemical substances from the viewpoint of the role of peat moss to be used as an agricultural and gardening material.

(1) Being capable of being formed into a thin film, having water absorption properties (particularly when dried) and being finely divided particles.

(2) Having viscosity properties. In connection with the above item (1), if a substance has viscosity properties, it is neither washed away when water is introduced thereon nor scatters as dust by the wind, and its effects can be maintained. In addition, it should be capable of being formed into a film easily (being easy to adhere onto the surface of peat moss).

(3) Being low-priced (capable of being used as a bulking filler).

(4) Causing neither environmental disruption nor soil pollution.

(5) Having no bad influence upon planting and growing.

(6) Being capable of being used as a pH adjustor. (Peat moss has a pH on the order of 3.5 to 4 and can not be used as culture soil as it is.)

(7) Being available easily and in abundant quantity.

(8) Becoming a binder. (Strength increases on being solid and only small molding pressure is needed.)

In the present embodiment, bentonite was used as a clay material satisfying all of the above selection elements.

Next, it was evaluated according to water absorption properties of peat moss whether or not a film can be formed on the surface of peat moss, using bentonite. The results are shown in Table 1 below.

TABLE 1

Water Absorption After A Given Time
Of Mixing Water With Peat Moss Subjected To A
Water Repellency-Prevention coating Treatment

| Concentration of bentonite aqueous solution | Time of water absorption | |
|---|---|---|
| | 5 sec. | 10 sec. |
| Treated with 5% aqueous suspension (50 g of bentonite to 1 liter of water) | 80–90% | 100% |
| Treated with 10% aqueous suspension (100 g of bentonite to 1 liter of water) | 100% | |
| Treated with 15% aqueous suspension (150 g of bentonite to 1 liter of water) | 100% | |
| Treated with 20% aqueous suspension (200 g of bentonite to 1 liter of water) | 100% | |
| Treated with 30% aqueous suspension (300 g of bentonite to 1 liter of water) | 100% | |

Note:
Peat moss with a water count of 17% was subjected to the water repellency-prevention coating treatment.

First of all, bentonite was suspended in water. The standard of concentration in this case is determined according to calculation, taking the adjustment of pH into consideration.

In this case, an aqueous suspension of from 5 to 30% (weight ratio) based on 1 liter of peat moss was prepared (50 to 300 g of bentonite were incorporated into 1 liter of water) and mixed well with 1 liter of peat moss immediately after the opening an original bag of the peat moss (with a water content of 47%) for from 10 to 20 minutes, and dried until the water content of the peat moss became about 17.5%. Then, 1 g of the treated peat moss was introduced into 100 cc of water of 18° C., and water absorption properties were evaluated according to the amount of white peat moss floating on the water. For example, 100% water absorption means the presence of no floating peat moss particles. Five tests were conducted per peat moss sample.

The object of this mixing treatment lies in the fact that bentonite particles suspended in water are adhered onto the cross section of the trunk (stem) of peat moss and the surface of the trunk (stem) of peat moss to form films, that even if peat moss is dried (water content being below 30%), the bentonite films accelerate water supply, and that particularly bentonite adhered onto the cross section of the trunk (stem) of peat moss exhibits a priming effect to break the balance of internal pressure easily and exhibits very high water absorption properties.

TABLE 2

Water Absorption After A Given Time
Of Mixing Water With Non-Treated Peat Moss

| Water content of peat moss after opening of original bag | Time of water absorption | | | |
|---|---|---|---|---|
| | 1 min. | 30 min. | 1 hr. | 3 hrs. |
| 47% | 0% | 4–5% | 20% | 70–80% |
| 22% | 0% | 0% | 1–2% | 4–5% |
| 15% | 0% | 0% | 1–2% | 1–2% |

Table 2 shows the results of examining the water supply properties of peat moss not subjected to a coating treatment according to the same test as above.

It is clear that peat moss subjected to a coating treatment according to the present invention has sharply higher water absorption properties as compared with natural peat moss with a water content of from 45 to 50% which has not been subjected to the coating treatment.

Ordinary water (tap water) was used in the above mixing treatment; however, it was revealed as a result of the test that if lukewarm water (of from 35° to 45° C.) is used, it takes about half the time (5 minutes) to treat. Hence, it can be said that water with a surface activating effect can reduce treatment time. Hereunder test examples will be shown.

(1) When 1 liter of peat moss, a solution of the surface active agent Dobanol 25 ethoxylate (9 mols) (Dobanol is a trade name of Mitsubishi Chemical Co., Ltd.) diluted 1000 times (1 g of Dobanol 25 ethoxylate based on 1 liter of water) and bentonite (90 g) were mixed, the treatment was finished in about 5 minutes.

(2) When 1 liter of peat moss, a solution of Dobanol 25 ethoxylate (9 mols) diluted 100 times (10 g of Dobanol 25 ethoxylate based on 1 liter of water) and bentonite (90 g) were mixed, the treatment was finished in about 3 minutes.

(3) When 1 liter of peat moss and 500 g of electric stone (tourmaline mineral) were introduced into 1 liter of water and mixed with a solution of bentonite (90 g) incorporated therein after 5 minutes, the treatment was finished in about 5 minutes.

According to the results of the above tests, a treatment with a surface active agent is a very effective means to treat peat moss. However, taking cost, safety and harmful influence upon plants into consideration, it can not be said that treatment employing a surface active agent is especially desirable.

Since water filtered with electric stone (tourmaline mineral), a natural mineral, has a surface activation effect and the same effect as in the case of employing lukewarm water and a surface active agent (solution diluted 1000 times), it is especially desirable to utilize this surface activation effect.

Since the above method maintains the effect of a rough tourmaline semipermanently, it can be deemed as an advantageous method from the viewpoint of cost.

If bentonite is suspended in water having the above surface active effect and a mixing treatment is performed with the suspension also in the case of using dry peat moss (for example with a water content of 20 to less than 30%), the treatment time is lengthened from 30 to 40% on an average but water absorption ability recovers and disadvantages in use thereof disappear. Though it was dried (water content below 20%) after introducing water again, no deterioration of the absorbing function was found.

When peat moss dried after the mixing treatment is observed with a microscope, it is revealed that treated peat moss becomes light black on the whole with very few colored portions, while non-treated peat moss has a lot of silvering portions on the surface of its trunk (stem), as described above. The difference can be clearly recognized visually.

It is clear according to the above that a bentonite film is formed on the surface of the trunk (stem) of peat moss. Besides, when drops of water were adhered onto the tip of a needle and allowed to come into contact with the outer skin of peat moss, the drops of water were absorbed by the whole outer skin instantaneously, and the outer skin of the peat moss became more blackish.

Next, one example of a method of using the culture soil according to the present invention will be described.

Figure 3A:
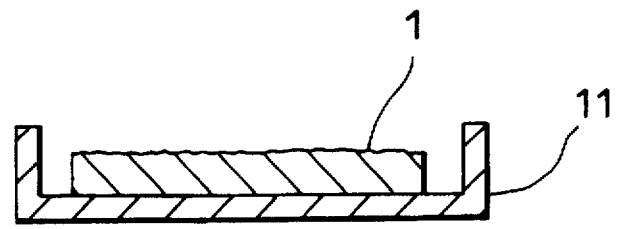
FIGS. 3(a, b, and c) are sectional views showing the use of an embodiment of a seedling-growing peat board according to the present invention.
Figure 3B:
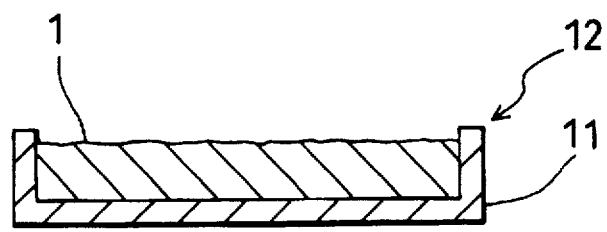
Figure 3C:
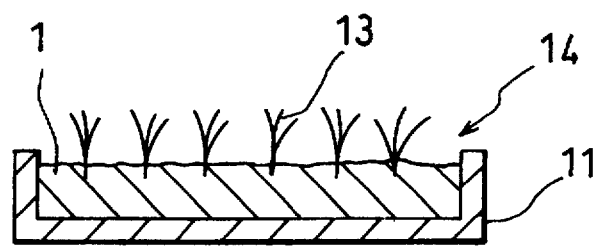

FIG. 3 shows the case of using a board-like seedling-growing peat board 1, an embodiment of the present invention, in a seed bed of a rice paddy.

First of all, the seedling-growing peat board 1 is put into a seedling-growing box 11, as shown in FIG. 3 (a). Next, the seedling-growing peat board 1 is watered. The seedling-growing peat board 1 becomes thoroughly swelled and a seed bed 12 is thus prepared.

The thus prepared seed bed 12 can be used in completely the same manner as a conventional seed bed and grows seedlings 13 after ordinary seedling-growing processes such as seeding, sprinkling water and soil-covering. The seed bed 12 of the present embodiment is lightweight; comparing the weight of this seed bed with seedlings grown thereon with a seed bed employing conventional culture soil (burnt soil), while the seed bed employing culture soil (burnt soil) weighs from 7 to 8 kg, that of the present embodiment weighs from 2.5 to 3 kg; thus the weight reduces to less than half. In addition, since the amount of water absorbed is from 2 to 4 times the weight of the culture soil, it takes from one-third to one-fifth of the time and labor on an average to sprinkle water during growing seedlings. The seedlings 13 grown on the seed bed 12 become a seed mat 14 having a proper strength due to the entwining of peat moss fibers and the roots of seedlings. Because of this, the seed mat 14 is difficult to destroy when it is transferred from the seedling-growing box 11 into a rice planting machine. When the seedlings 13 are transferred into a regular rice paddy with a rice planting machine, the seedlings 13 are easily removed from the seed mat 14 with a planting nail of the rice planting machine, and the number of seedlings thus removed can be maintained almost uniform.

Figure 2:
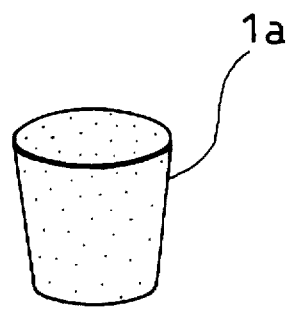
FIG. 2 is a perspective view showing an embodiment of molding culture soil according to the present invention into a pot-like form.

As an application example of the present invention, culture soil according to the present invention is formed into a board-like form, a hole is opened on the surface thereof, seeds of an ornamental plant are buried therein and it is placed on a road-type surface where the plants can grow only under natural conditions like rain. In this case, seeds may be mixed together with raw materials at the time of forming the culture soil or may be plastered onto the surface of the board of culture soil with clay. Besides, if seeds of a plant are buried in culture soil 1a (FIG. 2) according to the present invention, formed into a pot-like form in the above manner, a gardening article capable of being raised easily, requiring only watering, can be produced.

Since the present invention is constituted as described above, it has the following effects.

Peat moss with water repellency when it is dry is changed to have water absorption properties by allowing a clay film with water absorption properties to be adhered onto the circumference thereof, and it does not scatter as dust in the wind after it is dried.

In addition, the pH thereof can be adjusted at the same time.

According to the above, water-repellent peat moss with few germs and impurities and rich in natural sources can be used widely, for example, as seedling-growing bed soil for rice-production and as gardening culture soil. Particularly, the present invention can provide culture soil of good quality free from a poor balance of fertilizers by adding nutrient substances such as nitrogen, phosphoric acid and potassium needed in the growth of plants according to the object of use, in a mixing process employing an aqueous bentonite suspension.

Besides, the present invention can have a block-like form, and since it is allowed to contain water and is swelled in use, it is lightweight and compact before use and needs little space for storage, and the efficiency of the work of transportation is improved.

In addition, in the case of employing the present invention as a seedling-growing seed bed, it weighs about a half of the weight of a seed bed employing conventional culture soil (burnt soil), and the efficiency of the work of transporting a seed bed and the work of transferring a seed mat into a rice planting machine is improved.

Moreover, the seed mat after growing seedlings has a proper strength due to the entwining of peat moss fibers and the roots of the seedlings. Because of this, the seed mat is difficult to destroy when it is transferred into a seedling-growing box, seedlings are easy to remove from the seed mat when they are transferred into a regular rice paddy with a rice planting machine, and the number of seedlings per stump becomes stable.

I claim:

1. A culture soil having water absorption properties, comprising peat moss which is water repellent when dry, and a water-absorbing clay comprising bentonite adhered to the surface of the peat moss.

2. The culture soil according the claim 1, wherein a film of the clay is adhered to substantially the entire surface of the peat moss.

3. The culture soil according to claim 2, wherein the film of clay has a thickness of 10 to 250 microns.

4. A peat board for growing seedlings, comprising the culture soil of claim 1.

5. The peat board according to claim 4, having a square shape.

6. The peat board according to claim 4, having a thickness of 0.5 to 6 cm.

7. A process for producing a culture soil having water absorption properties, comprising the following steps:
   (a) treating water to render the water absorbable by peat moss;
   (b) suspending a water-absorbing clay comprising bentonite in the treated water of step (a);
   (c) contacting peat moss which is water repellent when dry with the suspension of step (b) to absorb the suspension onto the surface of the peat moss; and
   (d) drying the peat moss of step (c) to produce peat moss having the clay adhered to the surface of the peat moss.

8. The process according to claim 7, wherein step (a) comprises contacting water with a tourmaline mineral.

9. The process according to claim 7, wherein step (b) results in an aqueous suspension containing 5 to 30% by weight of the clay based on the weight of water in the suspension.

10. The process according to claim 7, which further comprises (e) molding the product of step (d) into a shape.

* * * * *